United States Patent [19]

Shiau

[11] Patent Number: 4,640,500
[45] Date of Patent: Feb. 3, 1987

[54] INHERENTLY EFFECTIVELY DAMPED COILED SPRING

[76] Inventor: Jgi J. Shiau, 3010 Persimmon Place, Fullerton, Calif. 92635

[21] Appl. No.: 793,250

[22] Filed: Oct. 31, 1985

[51] Int. Cl.$^4$ ............................................. F16F 3/02
[52] U.S. Cl. ................................. 267/168; 267/9 B; 267/61 R; 267/179
[58] Field of Search ............... 267/166, 167, 168, 179, 267/9 B, 61 R, 9 R

[56] References Cited

U.S. PATENT DOCUMENTS

| | | | |
|---|---|---|---|
| 1,938,099 | 12/1933 | Endsley | 267/9 B |
| 2,101,721 | 12/1937 | Scharfenberg | 267/61 R |
| 2,136,908 | 11/1938 | Pierce et al. | 267/61 R |
| 2,183,100 | 12/1939 | Holland | 267/9 B |
| 2,243,217 | 5/1941 | Lorini | 267/135 |

FOREIGN PATENT DOCUMENTS 0270169  5/1927  United Kingdom .

*Primary Examiner*—George E. A. Halvosa
*Assistant Examiner*—Matthew C. Graham
*Attorney, Agent, or Firm*—Ben E. Lofstedt

[57] ABSTRACT

The present invention relates to an improved inherently effectively damped coiled spring construction including a first coiled spring having a pair of ends, and a second coiled spring having a pair of ends, the second coiled spring being in the form of at least one tubular spring, the body of which is disposed about the body of the first coiled spring in operable contact therewith to provide the desired friction therebetween and whose ends are not contiguous with the ends of the first coiled spring and are free of contact with the weight imposed on the first spring and the support of the first spring so that when the first spring is dynamically compressed or expanded, relative twisting movement of the springs is made possible immediately following yielding of static friction force along their contacts, whereby the second spring disengages from the further twisting movement of the temporarily deformed coils of the first spring, thereby creating an effective friction generating and energy dissipating device for the first spring, thereby damping the relative movement of the first spring. Additional concentric tubular springs may be combined with the first and second springs to selectively provide the desired amount of damping action.

13 Claims, 7 Drawing Figures

U.S. Patent     Feb. 3, 1987     4,640,500
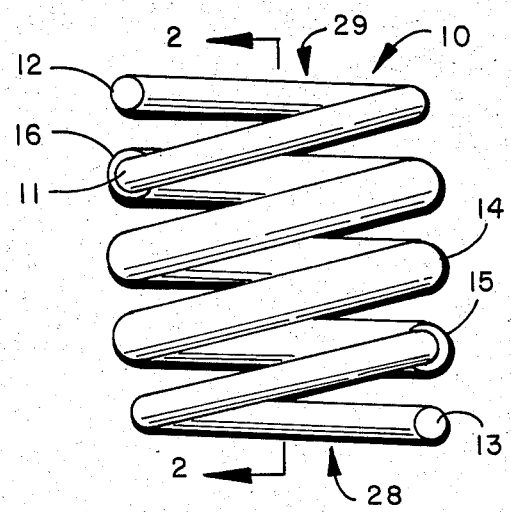
FIG. 1
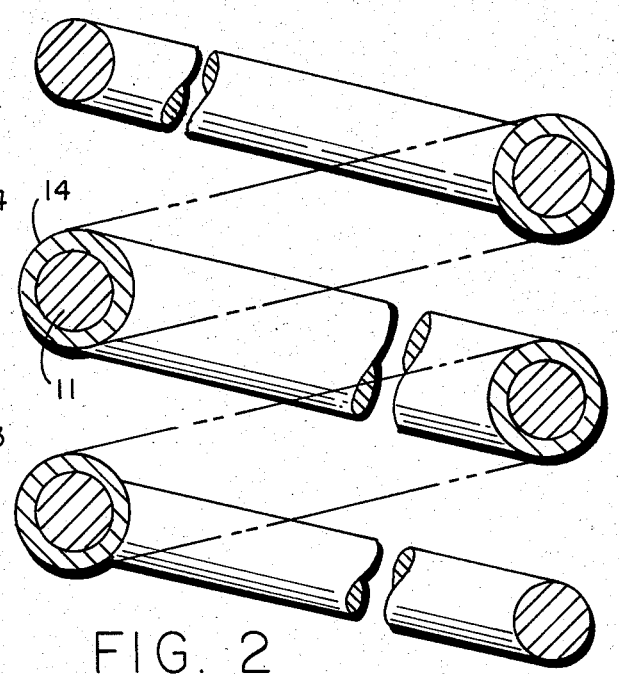
FIG. 2
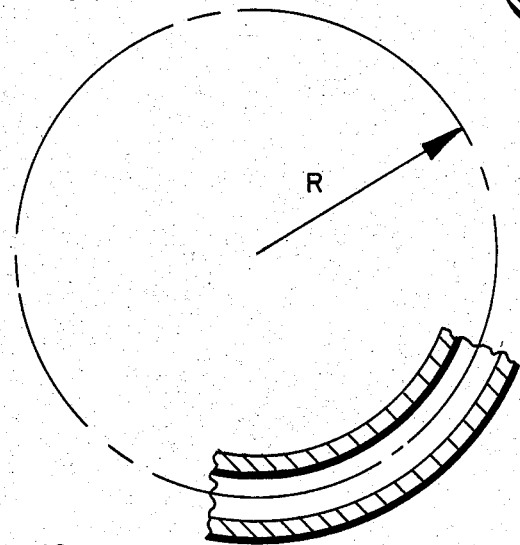
FIG. 3
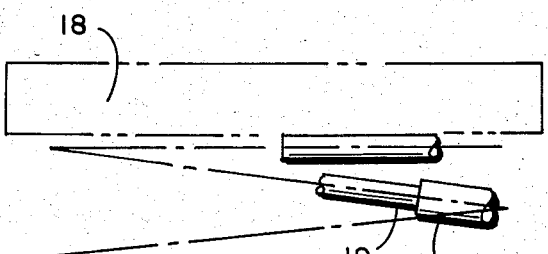
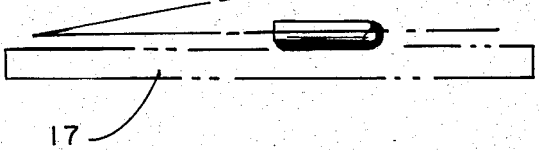
FIG. 4
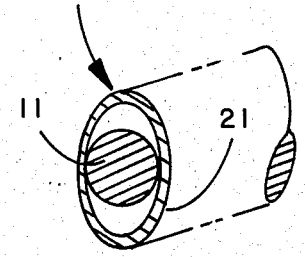
FIG. 5
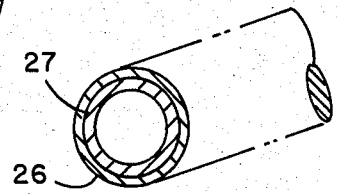
FIG. 7
FIG. 6

INHERENTLY EFFECTIVELY DAMPED COILED SPRING

BACKGROUND OF THE INVENTION

1. Field of the Invention

The field of the invention lies in the area of effectively damped coiled springs, and, more particularly, in the area of mechanically effectively damped helically-wound coiled springs.

2. Description of the Prior Art

Perhaps the closest prior art device is shown and described in British Pat. No. 270,169 issued on May 5, 1927 to Timmis. The device described in this patent purportedly relates to improvements in coiled springs consisting of:

". . . springs of helical form, made from composite rods or bars, whose components are arranged concentrically, such rods or bars when coiled into the form of helical springs having in use a more uniform distribution of torsional stress, and at the same time providing an inherent dampening effect to the vibrations of the spring." (Page 1, Col. 1, Lines 9–16, inclusive).

". . . I arrange such rods or bars of any suitable material, and shaped so that the outer component embraces concentrically one or more components. To give an example, the outer component may be a tube of circular, elliptical or other section. The inner component or components may be of steel or other material preferably of a metallic nature. The outer component of tubular form, embraces another tube or solid bar; this inner component if of tubular construction, may also embrace a tube or solid bar, and so on. Such components may be touching one another throughout their length, or separated in any suitable manner. Each component forming this composite rod or bar, will, when coiled into a spring of helical shape, have in use a different period of free vibration to the other components; this will introduce a dampening action to the vibrations of the completed spring." (Page 1, Col. 1, Lines 17–22, inclusive, and Col. 2, Lines 23–40, inclusive.).

In this particular method of coiled spring construction, the composite spring which is described in this particular patent, does not actually provide for damping of the primary, or solid, spring, but instead assumes a period of vibration which is a mathematically predictable composite of the inherent, natural, free period of vibration of the two springs. Such composite frequency or period of vibration is clearly created via this construction because the ends of the two, or more, springs are contiguous so that when a dynamic force is impressed upon the composite spring, the end turns of the springs are contemporaneously compressed or expanded depending on the nature of the applied force. Consequently, the motion of the composite spring cannot be described as being damped because the composite spring acts and functions as a single, new spring with an inherently different period of vibration than that of the other two, or more, springs from which the composite is constructed because the impressed force acts upon both simultaneously. Since this is the case, the highly desirable damping action does not occur as proposed and suggested by the patent.

True or actual coiled spring damping action is highly desirable for a number of reasons. One reason is that such damping would virtually eliminate the need for motion damping devices which are typically used in conjunction with springs, such as automobile shock absorbers. Another reason that such damping devices are desirable is that in the event that such springs would be used to isolate large buildings/equipments from vertical movements and rocking movements associated with horizontal movements, such vertical and horizontal displacements and/or movements would not be directly translated to the building structure but would be damped, that is, the springs' natural tendency to "track" or to "follow" the movement impressed on the support to the weight supported at the opposite end of the spring would be significantly delayed in time and reduced in magnitude thereby resulting in substantially reduced destructive action upon the building/equipment structure. Presently, there is no effective mechanism for accomplishing these highly desired, and long sought-after spring damping features and/or characteristics.

SUMMARY OF INVENTION AND OBJECTS

Fundamentally, the present invention relates to an improved inherently effectively damped coiled spring construction including a first coiled spring having a pair of ends, and a second coiled spring having a pair of ends, the second coiled spring being in the form of at least one tubular spring, the body of which is disposed about the body of the first coiled spring in operable contact therewith to provide the desired friction therebetween and whose ends are not contiguous with the ends of the first coiled spring and are free of contact with the weight imposed on the first spring and the support of the first spring so that when the first spring is dynamically compressed or expanded, relative twisting movement of the springs is made possible immediately following yielding of static friction force along their contacts, whereby the second spring disengages from the further twisting movement of the temporarily deformed coils of the first spring, thereby creating an effective friction generating and kinetic energy dissipating device for the first spring, thereby damping the relative movement of the first spring. Additional concentric tubular springs may be combined with the first and second springs to selectively provide the desired amount of damping action.

An important and primary object of the present invention is to provide helically-wound or coiled springs with an effective friction mechanism in order to slow down the rate of spring movement or to "damp" the spring when a dynamic expansive or compressive force is applied to the improved spring construction disclosed herein.

Another primary and important object of the present invention is to provide a new and unique form of spring construction which provides a coiled spring with inherently effectively damped characteristics.

A yet still further and important object of the instant invention is to provide means for optimally constructing an inherently effectively damped helically-wound spring.

One object of the invention disclosed herein is to eliminate the need to use separate shock-absorbing mechanisms for damping the spring action following the impressing and releasing of a dynamic load thereon.

Another highly desirable and long-sought-after object of the invention is to provide a relatively simple and economical means for selectively optimizing the spring movement damping characteristics.

An object of the instant invention disclosed herein is to provide a means for frictionally dissipating the action of the forces impressed upon the spring by operably restricting the torsional movement of the coils of the spring.

Other objects, features, and characteristics of the invention disclosed herein will be brought forth and further understood as the description of the invention proceeds further herein, where such is disclosed in the balance of the Specification, Claims and the Drawings hereinafterwards.

BRIEF DESCRIPTION OF THE DRAWINGS

FIG. 1 is a side vertically arranged elevational view of the invention disclosed herein.

FIG. 2 is an enlarged portion of a section of the present invention taken along Plane 2—2 of FIG. 1.

FIG. 3 is a figure of a portion of one of the coils of the spring depicted in mathematically-represented form the essence and function of the present invention.

FIG. 4 is a side vertically-arrange elevational view of the instant invention shown in mathematically-represented form and shown disposed between a support at one end of the spring and a weight impressed on the other end of the spring.

FIG. 5 is an alternate embodiment of the invention.

FIG. 6 is a sectional view of another embodiment of the invention showing a solid rod forming the first spring, a second spring formed of tubing about the first spring, and a third spring formed of tubing disposed about the second spring.

FIG. 7 is a sectional view of another embodiment of the invention showing a pair of concentrically arranged springs each formed of a length of helically-wound tubing materials.

DESCRIPTION OF THE PREFERRED EMBODIMENT OF THE INVENTION

With reference now to all of the Drawings herein, and with specific reference now to FIG. 1, there is shown one embodiment of the present invention generally indicated at 10, which is generally referred to as an improved inherently effectively damped coiled spring, comprising a first coiled spring 11, having a pair of oppositely-disposed ends 12, 13, a second coiled spring 14 having a pair of oppositely-disposed ends 15, 16 and formed in the shape of a tubular body arranged in operable frictional engagement about the coils mediately disposed in the first spring 11 and the ends 15, 16 of which are not disposed in contiguous relationship to the ends 12, 13 of the first spring 11 and are free of contact with the support 17 and the weight 18 with which the ends 12, 13 of the first spring 11 are in operative contact therewith, so that when the first spring 11 is dynamically compressed or expanded so as to produce torsional twisting of the respective coils 19 comprising the first spring 11, when such twisting movement overcome the static frictional force established therebetween, such twisting movement is further restricted by dynamic friction created between the relatively static coils 20 of the second spring 14 and the first spring 11, and, as a result thereof, the kinetic energy induced into the first spring 11 is at least partially dissipated by the friction created between the coils 19 of the first spring 11 and the coils 20 of the second spring 14, thereby damping the overall axial movement of the spring combination 10.

Turning now to FIG. 5 of the Drawings, there is shown an alternative embodiment of the present invention. In this particular embodiment, the second spring 21 is depicted in non-circular, or elliptical, form. Because the second spring 21 is formed in the shape of an elliptical form, the degree of frictional contact between the first spring 11 and the second spring 21 is substantially reduced, thereby reducing the effect of the damping action in the spring combination 10.

As has been previously discussed hereinbefore, one of the primary objects of my new and improved inherently damped coiled spring 10 is to provide a helically wound, or coiled, spring with an inherent and effective friction generating and energy dissipating mechanism in order to create a significant damping effect to reduce the rate of movement from that rate of movement which is impressed upon the spring 11 by the combination of the support 17 and the weight 18 impressed thereon, and further to optimize the friction generating and energy dissipating mechanism created by the two springs 11 and 14 in a selectable, controllable manner.

In order to more clearly understand the nature and scope of my invention disclosed herein, I believe it will be extremely valuable to such comprehension and understanding in a side-by-side, feature-by-feature comparison with the invention taught by British Pat. No. 270,169 which was issued on May 5, 1927 and the invention disclosed in U.S. Pat. No. 2,243,217 which was issued on May 27, 1941.

In British Pat. No. 270,169 it is claimed that the purpose and function of the device disclosed therein is to give a more uniform distribution of the torsional stresses created in the use of the spring and to provide for an improved damping effect on spring vibrations or the relative axial movements of the springs during the operational functioning of the spring. However, while the inventor indicates that the key to achieve one of the stated and desired objects is to create a more uniform distribution of the torsional stress, which is defined in the patent, so as to construct the improved spring combination by making the required components touch one another *THROUGHOUT THEIR ENTIRE LENGTH*, or separated in any suitable manner (See Page 2, Column 2, lines 22-24), each of the improved helically-wound springs is a set of helically-wound tubular springs with or without a rod spring. Consequently, as a practical matter, such an arrangement would, in fact, give virtually no actual damping. This fact will be become increasingly obvious and quite clear as the explanation proceeds further herein.

Additionally, in the coil spring construction as related by U.S. Pat. No. 2,243,217, issued on May 27, 1941, the inventor claimed that his invention consisted of:

"3. A spring construction comprising in combination a coil spring wound in torsion and a lead tin alloy coil connected at one end to the spring but otherwise free of attachment thereto, for controlling unwinding of the spring". (Page 2, Column 2, Lines 42-46).

In other words, each of the improved coil springs in U.S. Pat. No. 2,243,217 is a set of two independent coil springs connected at one end and without connection at the another.

In order to retard the return of the ordinary spring, the other spring is formed of a lead tin alloy (referenced by the inventor as a retarding material on Page 1, Column 1, Line 14). To achieve this retarding function, the patent states that:

"... comparatively LITTLE ENERGY is consumed in overcoming it so that the spring starts in motion, leaving considerable spring energy available for useful work." (Page 1, Column 1, Lines 35–38).

Hence, the spring construction in the U.S. Pat. No. 2,243,217 as shown will clearly function in a manner which acts against damping of the system energy. Therefore, in order to achieve the very desirable goal of providing an effective and controllable damping capability to the device disclosed by this U.S. Pat. No. 2,243,217, the helical springs formed of a solid rod or tubing, requires a different structural system be employed than that which is disclosed in the British Pat. No. 270,169 or, for that matter, the mechanism taught by U.S. Pat. No. 2,243,217.

On the other hand, the improved helical springs formed and constructed in the manner shown by my current invention 10, as depicted and illustrated in the accompanying Drawings, has a helically-wound spring 14 formed of tubing material, or formed a series of concentrically-arranged helically-wound tubes 23, 24 which are, in turn, arranged about a solid rod 25 as shown in FIG. 6 of the Drawings, or a plurality of concentrically arranged, helically-wound tubes 26, 27 as shown in FIG. 7 of the Drawings, none of which has the loaded end coil of the spring and the supported end coil of the spring as each of the springs disclosed in the prior art do, but which is concentrically *arranged about* a helically formed rod 25 as shown in FIG. 6 or tube 27 as shown in FIG. 7, with a static friction force disposed along the entire length of the contact with the spring 11 (as shown in FIG. 1) or 25 (as shown in FIG. 6) or 27 (as shown in FIG. 7). As clearly shown, the attached helically-wound tubes as shown in the Drawings have their own torsional stiffness which is the key to provide an effective friction mechanism.

It is clear, therefore, that not only are the functions, inherent characteristics and configurations of my improved helical inherently damped springs as disclosed herein are uniquely distinct and substantially different from the springs shown in British Pat. No. 270,169 or U.S. Pat. No. 2,243,217.

Turning now again to the improved helical springs in the British Pat. No. 270,169, it is now obviously clear that these springs are simply assemblies of helical rods and helical tubes having identical lengths and identical boundary conditions. In essence, the spring construction revealed therein is merely a combination of independent helical springs mechanically joined together for the purpose of supporting a load.

However, the improved helical springs forming the sum and substance of my invention herein have a helical rod 25, (or tube 27) spring as a supporting structure and a helical tubing 24 (or concentric helical tubes 23, 24 or 26) concentrically attached to the helical spring 11 or 25, with a frictional force distributed along the entire length of the spring 11 or 25, with the all-important exclusion of the two end turns or coils of the helical spring 11 or 25, 27 thereby providing an effective friction mechanism to the spring 11, 25 or 27.

The reason for this is quite simple once the operative mechanism is clearly understood. The two end turns or coils, generally indicated at 28 and 29 and located at opposite ends of the spring 11, 25 or 27 represent the loaded boundary and the supported boundary of the spring 11, 25 or 27. The loaded boundary is defined by the weight 18 and the supported boundary is defined by the support 17; all of which is illustrated in FIG. 4 of the Drawings. The attached helical tubing 14 having its own distinct coils with their own torsional stiffness will be twisted together concurrently as a whole with the helical spring 11 until the static friction force between the coils of the spring 11 and the attached spring 14 formed by the helical tubing is overcome. When this occurs, a relative twisting movement and displacement occurs between them. In this process of overcoming the static friction force existing between them, when relative twisting movement and kinetic frictional forces occur, the system kinetic energy is then dissipated by such friction forces.

Additionally, the British Pat. No. 270,169 states that: "Each component forming this composite rod or bar, will, when coiled into a spring of helical shape, have in use a different period of free vibration to other components; this will introduce a dampening action to the vibrations of the complete spring." (Page 1, Col. 2, Lines 34–40.)

However, it can be seen from the following that the damping effect associated with different periods of free vibrations among different spring components is negligible, if any. According to the facts given in the British Pat. No. 270,169, as stated in the preceding paragraph, it is quite clear that the systems' axial stiffness of this particular helical spring assembly as disclosed in the British Pat. No. 270,169 is simply the sum of the spring constants of each of its helical spring components and the system practically does not involve damping.

In order to further clarify this matter, consider the following physical anaylsis. When the spring system is supporting a Weight W, the system is practically a single-degree system with a Mass W/g and the system stiffness defined above. When the system is subjected to a dynamic load, all components will oscillate in the single system vibration mode. The masses associated with weights of the its components are relatively too small to cause any additional vibration modes. Thus, it is clear that the vibration modes associated with masses of individual components, which are those implied in the British Pat. No. 27,169 are TOO INSIGNIFICANT TO PRODUCE A DAMPING EFFECT AS CLAIMED. This conclusion can even be further strengthened with the preceding facts and on the following well-established engineering principles.

In calculating the deflection of helical spring normally only the effect of twist of the coils is taken into consideration. Let $d\phi$ designate the relative angle of twist between two adjacent cross sections of the helical spring and let $\delta$ be its axial deflection, then $$\delta = \int_0^{\phi_{max}} R d\phi$$

in which R is the radius of the cylindrical surface containing the centerline of the spring (Reference: Strength of Materials, Part I, by S. Tomoskenko, Third Edition, D. Van Nostrand Co., Inc.). For the case involving the combined spring arrangement such as is shown and taught in British Pat. No. 270,169, where both the centrally arranged helical rod spring and the concentrically arranged helical tube spring are contiguously disposed along the entire length of combined helical spring assembly including the two end turns. That is to say that the helical rod spring and the helical tube spring have the same end conditions, or boundary conditions and because of these boundary conditions, the combination spring and its action are limited by the following constraint condition: $\delta_r = \delta_t$ which must be satisfied, in which $\delta_r$ and $\delta_t$ designate, respectively, the axial displacement of the helical rod spring and that of helical tube spring. Because of this constrain condition and the fact that R are common to both springs, $\phi_r$ has to be equal to $\phi_t$, in which $\phi_r$ and $\phi_t$ designate respectively the angle of twist of the helical rod spring and that of the helical tube spring. This indicates that there is practically no relative torsional movement between these two components and, practically speaking, the composite helical spring cannot dissipate the system kinetic energy. In other words, *damping cannot occur.*

These facts, once again, reveal that the arrangement of helical spring assembly in the British Pat. No. 270,169 has no real damping. If such occurs, such damping action is realistically negligible.

However, in my invention, the concentrically attached helical tubings do not have two end turns but have their own individual torsional stiffness, and, hence, provide an effective friction generating and kinetic energy dissipating mechanism to the helical spring combination. For this case, the constraint condition: $\delta_r = \delta_t$ is not applicable, and, therefore, $\phi_r$ and $\phi_t$ are not necessarily equal. This fact indicates that when static friction force which exists between the centrally disposed, and generally, solid helical spring and the initimately attached helical tube is overcome due to the compressive or expansive forces impressed upon the ends of the centrally disposed spring, relative torsional movement between these two spring components occurs, and, thus, the kinetic energy of the centrally disposed spring is dissipated or damped by such frictional action. The means to optimize the friction mechanism is disclosed and discussed further hereinafterwards.

In a system where mechanical or structural vibration occurs, the typical analytical or mathematical model of the system is defined by three parameters —mass, spring and dashpot. Mass inherently includes an inertial force and the spring absorbs, or stores, energy, while the dashpot, or damper, dissipates kinetic energy. Springs are highly desirable for use as vibration isolators because metal helical springs can carry heavy loads, provide a wide range of large static deflections and low natural frequencies, are practically permanent and their spring properties are not substantially affected by temperature and other environmental conditions. However, metal helical springs have some inherent characteristics which typically have, in the past, limited their use and application as vibration isolators. One such characteristic is that such springs have little inherent damping which is necessary in order to dissipate the kinetic energy impressed upon the spring. Without such damping, metal springs which are used in vibration isolation systems expose the system to be isolated to the frequently deleterious effects of resonance which cause the amplitude of vibratory action to increase beyond the physical limits of the system which the springs are designed to protect, because the undamped springs are unable to damp the spring and/or system motion and to terminate system oscillation. Therefore, steel helical springs alone cannot be used as vibration isolators and must be employed in conjunction with damping devices in order to achieve vibratory isolation and control.

The damped helical springs disclosed herein have effective, inherent and yet, simple damping mechanisms to dissipate kinetic energy by the frictional action promoted by the relative torsional movement between, for example, the thin-walled tubular cross section and solid round section of the spring construction shown and illustrated in FIGS. 1, 2, 5 and 6. An assembly of a metal rod 11, 25 encased in a metal tubing 14, 21, 24 (or concentric tubes as shown in FIG. 6 and/or simply concentric tubes without the solid metal rod as shown in FIG. 7) shorter in length than the rod, is bent into a combination helical spring assembly 10 which is inherently effectively damped. The contact pressure between those two different spring components 11, 14 is created during the bending process as the components are formed into the helical shape. The presence of the contact pressure can be explained in the following manner. After the circular metal tubing 14, 23, 24, 26, or 27 alone is bent into a helical form, because of large bending strains in the longitudinal axis of tubing and Poisson's Ratio of the particular metal, the cross section of the tubing becomes elliptical. On the other hand, after a metal rod is bent into helical shape, the cross section practically stays round. It then becomes apparent that during bending of the assembly of the tubing 14 and the rod 11, that the changing of the shape of tubing 14 cross section will be interfered by the rod 11. This interference causes the desired contact pressure to exist between the two parts; namely, the rod 11 and the tubing 14.

The contact pressure can be selectively optimized, if required, by varying the wall thickness of the tubing 14, 21, 23, 24, 26, or 27, by changing the radius of the cylindrical surface containing the centerline of the spring 10 relative to the radius of the helical spring 10, by modifying the maximum gap between the tubing 14 and the rod 11 to facilitate the assembly of the two elements 11 and 14, and through heat treating of one element relative to the other prior to assembling and before being bent into the desired or selected helical shape.

The merits of this friction mechanism are numerous, but, perhaps, the most prominent of such features are its simplicity and effectiveness. This mechanism is not only simple in shape but is relatively easy to produce. Further, it is effective because the friction occurs along a maximal portion of the entire length of attached helical tubing. The functional interrelationship of the two active spring elements which make up this unique inherently effectively damped spring 10 is that the friction and the relative angle of twist between spring and attached helical tubing are initiated by its supporting weight alone. This indicates that the friction is in effect as soon as vibration is started.

The damped helical springs 10 are uniquely simple and superior vibration isolators inherently containing the dual function of acting as both vibration absorbers (ordinary springs) and vibration dampers (such as pneumatic or fluid dampers), and have the highly desired excellent durability and dependability associated with all metal parts. It is anticipated that these unique damped springs 10 will embrace a wide spectrum of practical usage as vibration isolators consisting of springs and dampers, such as those for automobiles and machineries, because of their structural quality, and will serve to eliminate the need for separate vibration dampers, such as the shock absorbers on automobiles and the like. Additionally, it is anticipated that the damped helical springs will find wide-spread use and application as base isolators for heavy, safety-related and permanent systems such as buildings and heavy equipment, in order to minimize seismic effects.

It should be clearly understood that the present invention may be modified and changed without departing from the true spirit and scope of the invention disclosed herein, the scope of which is intended to be limited only to the breadth and extent of the claims appended hereto. For example, the springs may be constructed of materials other than metals and still be functionally operable for certain, selected applications and use. Further, the second, tubular spring 14 may be reduced in length so that the ends thereof terminate prior to the last single turn or coil of the first spring 11 and the damping of the dynamic motion of the first spring 11 will still occur. Additionally, the second, tubular spring 14 may be increased in length so that the ends thereof do not extend to the ends of the first spring 11, or are contiguously disposed therewith and the damping effect of the dynamic motion of the first spring 11 of the dynamic motion of the first spring 11 will still occur provided, however, that the ends of the second spring 14 do not contact the weight 18 and the support 17 which are in contact with the ends of the first spring 11.

What is claimed is:

1. An improved inherently effectively damped coiled spring construction, comprising:
   (a) a first coiled spring having a pair of ends and a plurality of coils, the two ends of which are adapted to operably bear a load;
   (b) a second coiled spring having essentially the same coil diameter as the first spring and further having a pair of ends and a plurality of coils, said second coiled spring being in the form of at least one tubular spring, the coils of the tubular spring being concentrically disposed about each of the coils of the body of the coils of the first coiled spring in operable intimate frictional engagement therewith, the second coiled spring being shorter in length than the body of the first coiled spring so that the ends of the second coiled spring are not contiguous with the ends of the first coiled spring and are free of contact with the load imposed on the ends of the first springs so that when the first spring is dynamically compressed or expanded, relative twisting movement between the coils of the springs does not occur, but only occurs immediately following the yielding of the static frictional engagement which exists along essentially the entire faying surface between the two springs, whereby the second spring disengages from further twisting movement of the temporarily deformed coils of the first spring, thereby creating an effective friction generating and energy dissipating device and damping the relative axial movement of the combination formed by the first and second springs.

2. The improved inherently effectively damped coiled spring construction of claim 1, wherein said coiled springs are helically wound.

3. The improved inherently effectively damped coiled spring construction of claim 1, wherein said springs are engaged with a selected static friction force therebetween.

4. The improved inherently effectively damped coiled spring construction of claim 1, wherein the first coiled spring is formed from a solid rod of material.

5. The improved inherently effectively damped coiled spring construction of claim 4, wherein the first coiled spring having a pair of ends is formed of a solid rod of metal material.

6. The improved inherently effectively damped coiled spring construction of claim 1, wherein the second coiled spring having a pair of ends is formed from tubular material.

7. The improved inherently effectively damped coiled spring construction of claim 1, wherein the second coiled spring having a pair of ends is formed from tubular metal material.

8. The improved inherently effectively damped coiled spring construction of claim 1, wherein the cross section of the body forming the first spring is substantially circular.

9. The improved inherently effectively damped coiled spring construction of claim 1, wherein the cross section of the body forming the second spring is substantially circular.

10. The improved inherently effectively damped coiled spring construction of claim 1, wherein the cross section of the second spring is elliptical.

11. The improved inherently effectively damped coiled spring construction of claim 1, further comprising a third spring disposed about the body of the second spring in the form of at least one tubular spring and disposed in operable frictional engagement therewith, and further having a pair of ends, the third coiled spring being disposed about the body of the second coiled spring so that the ends of the third coiled spring are not contiguous with the ends of the first coiled spring and are free of contact with the weight imposed on the first spring and the support of the first spring so that when the first spring is dynamically compressed or expanded, relative twisting movement between the coils of the springs occurs immediately following the yielding of static frictional force along their respective contact surfaces, whereby the second spring disengages from the further twisting movement of the temporarily deformed coils of the first spring and the third spring disengages from the further twisting movement of the temporarily deformed coils of the second spring thereby creating an effective friction generating and energy dissipating device and thereby damping the relative axial movement of the first spring.

12. The improved inherently effectively damped coiled spring construction of claim 11 wherein each of the ends of the third spring is at least one full coil turn away from each of the ends of the first spring.

13. The improved inherently effectively damped coiled spring construction of claim 1 wherein each of the ends of the second spring is at least one full coil turn away from each of the ends of the first spring.

* * * * *